United States Patent
Pierno et al.

[15] 3,670,762
[45] June 20, 1972

[54] SMALL ENGINE SERVICE CENTER

[72] Inventors: Michael C. Pierno, 16146 Beverly Road, Birmingham, Mich. 48009; Vincent J. Figas, 19716 Damman, Harper Woods, Mich. 48236

[22] Filed: July 30, 1970

[21] Appl. No.: 59,605

[52] U.S. Cl. ......................................................... 137/342
[51] Int. Cl. ............................................................ F16k 51/00
[58] Field of Search ............... 137/342, 588, 355.27, 355.28, 137/355.16, 355.17

[56] References Cited

UNITED STATES PATENTS

| | | | |
|---|---|---|---|
| 2,498,229 | 2/1950 | Adler | 137/342 X |
| 3,537,622 | 11/1970 | Venus, Jr. et al. | 137/588 X |
| 2,490,736 | 12/1949 | McGarry | 137/355.22 X |
| 2,525,074 | 10/1950 | Knight | 137/342 X |
| 2,735,717 | 2/1956 | Harman | 137/355.17 X |
| 2,866,474 | 12/1958 | Gummere et al. | 137/580 X |
| 2,893,422 | 7/1959 | Schiltz | 137/355.17 |
| 3,532,114 | 10/1970 | De Frees | 137/588 X |

*Primary Examiner*—Samuel Scott
*Attorney*—McGlynn, Reising, Milton & Ethington

[57] ABSTRACT

A mobile flammable fluid handling assembly including a regular fuel tank and a mixed fuel tank juxtaposed to one another and spaced by a platform from a used oil tank and a new oil tank. A manually actuated pump is associated with each fuel tank and is connected through valves to the associated tank and to a fill hose and a siphon hose. The valves for each tank may be positioned in "fill" or "siphon" positions so as to deliver fuel from the associated tank through the fill hose when in the "fill" position and to draw fuel into the associated tank through the siphon hose when in the "siphon" position. A vent hose is connected to the fuel tanks and has a quick disconnect fitting on the free end thereof. A manually operated pump with a hose attached thereto is connected to the new oil tank.

9 Claims, 2 Drawing Figures

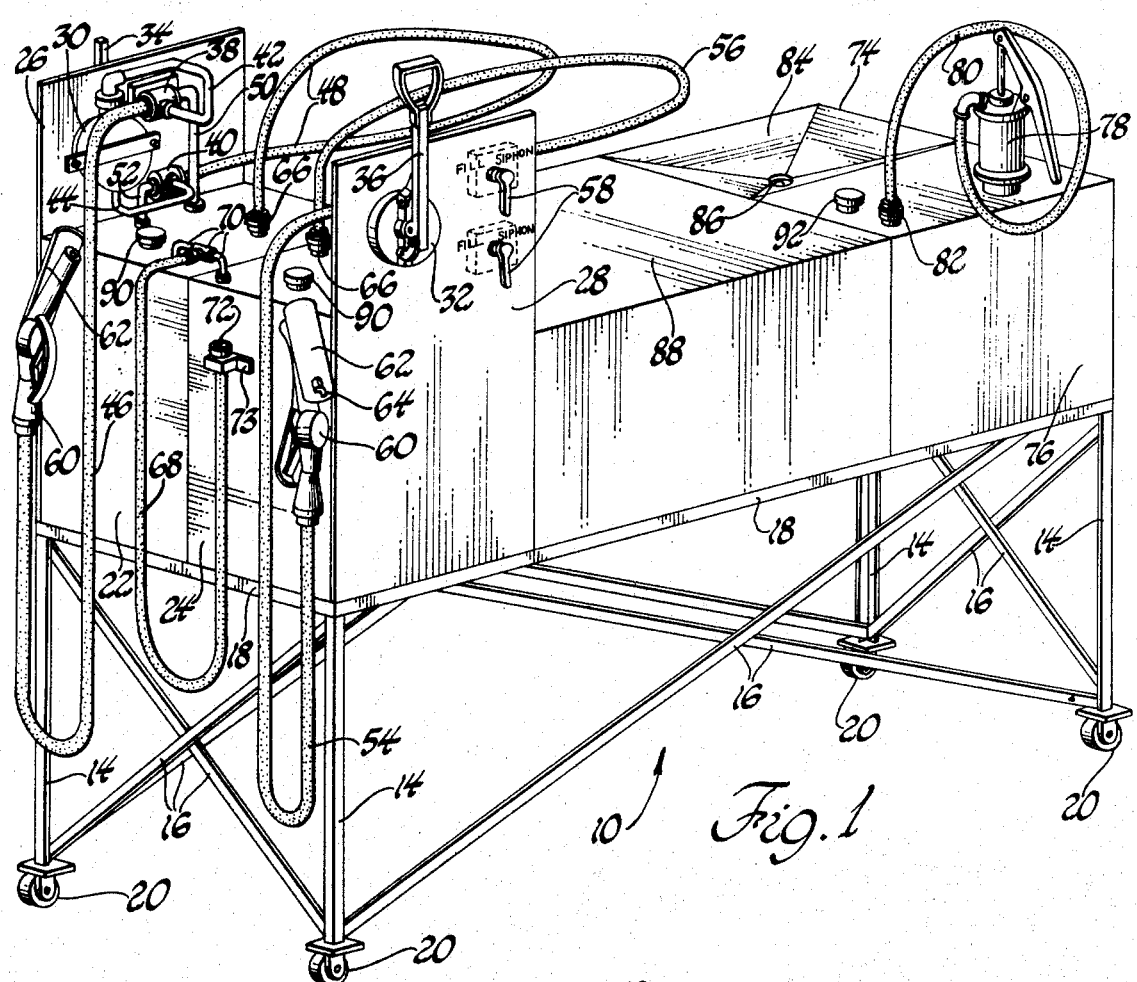
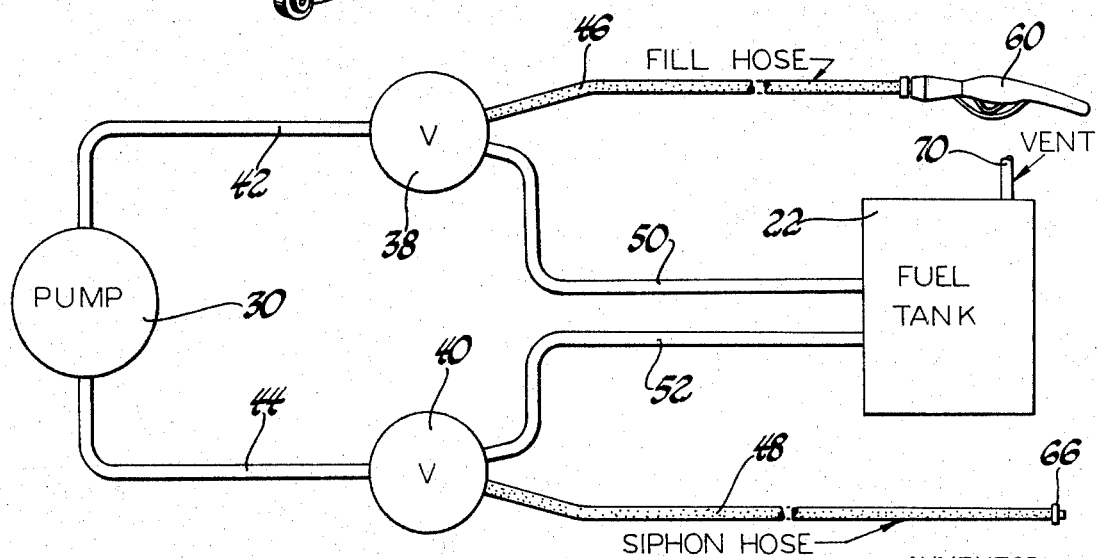

SMALL ENGINE SERVICE CENTER

This invention relates to a flammable fluid handling assembly which has various uses but is particularly suited for use in the maintenance of small gasoline engines.

Although the invention may be utilized in various small engine maintenance environments there is a particular need for the fluid handling assembly of this invention in industrial arts teaching facilities in schools. Many schools, such as high schools, have industrial arts programs including courses covering the fundamentals of small engine operation and repair. During such courses the students dismantle, rebuild and test small gasoline engines of the two cycle and four cycle variety. These programs require that oil and gasoline be removed from and inserted into the engines daily or during various steps of the course. In the case of two cycle engines gasoline is mixed with oil to provide a mixed fuel whereas the four cycle engines utilize regular gasoline as a fuel. Both, however, require motor oil.

As will be appreciated, the removal and insertion of these flammable liquids creates a serious hazard particularly in view of the fact that the students handling such fluids are frequently novices and unaware of the potential hazards.

Accordingly, it is an object and feature of this invention to provide a flammable fluid handling assembly upon which small engines may be supported for the removal and insertion of fuel and oil in a manner that substantially decreases the potential hazards in handling such flammable fluids.

In correlation with the foregoing object and feature, it is another object and feature of this invention to provide a flammable fluid handling assembly which includes support means supporting a pair of fuel tanks with flow control means for delivering fuel from each fuel tank and for siphoning fuel into each fuel tank and a pair of oil tanks supported on the support means in spaced relationship to the fuel tanks with a platform supported by the support means for supporting an engine between the oil tanks and the fuel tanks.

Other objects and attendant advantages of the present invention will be readily appreciated as the same becomes better understood by reference to the following detailed description when considered in connection with the accompanying drawings wherein:

FIG. 1 is a perspective view of the preferred embodiment of the instant invention; and FIG. 2 is a schematic view showing the flow control means for delivering fuel and siphoning fuel from each fuel tank.

A preferred embodiment of a flammable fluid handling assembly constructed in accordance with the instant invention is generally shown at 10 in FIG. 1.

The assembly includes a support means comprising a generally rectangular frame 18 supported on the vertical legs 14 with the braces 16 interconnecting the legs. Wheels or casters 20 are secured to the bottom ends of the legs 14 for rendering the assembly mobile.

Fuel tank means, comprising the regular fuel tank 22 and the mixed fuel tank 24, is supported on the frame 18 of the support means. The outer walls 26 and 28 of the respective fuel tanks extend upwardly above the tops of the fuel tanks.

The assembly includes flow control means for delivering fuel from each fuel tank and for drawing or siphoning fuel into each fuel tank. The fuel control means includes a regular fuel pump 30 and an identical mixed fuel pump 32. The fuel pumps 30 and 32 are positive displacement piston type pumps which are manually actuated by the handles 34 and 36. Also included in the fuel control means is a first regular fuel valve 38 and a second regular fuel valve 40. The first regular fuel pump 30 and the valves 38 and 40 are attached to and supported by the upper portion of the wall 26. In a similar manner, although not shown, first and second mixed fuel valves are supported along with the mixed fuel pump 32 on the upper portion of the wall 28.

A fluid line 42 connects the regular fuel pump 30 with the first regular fuel valve 38 and another fluid line 44 connects the regular fuel pump 30 with the second regular fuel valve 40. A regular fuel fill hose 46 is connected to the first regular fuel valve 38. A regular fuel siphon hose 48 is connected to the second regular fuel valve 40. Regular fuel fluid line means comprising the lines 50 and 52 connect the first and second regular fuel valves 38 and 40 with the regular fuel tank 22. Although not shown, in a similar manner the flow control means includes a fluid line connecting the mixed fuel pump 32 with the first mixed fuel valve and another fuel line connects the mixed fuel pump 32 with the second mixed fuel valve and a mixed fuel fill hose 54 is connected to the first mixed fuel valve and a mixed fuel siphon hose 56 is connected to the second mixed fuel valve. Additionally there are fuel lines which connect the respective first and second mixed fuel valves with the mixed fuel tank 24.

The first and second regular fuel valves 38 and 40 have fill and siphon positions whereby the valves may be positioned in the fill position to pump fuel from the regular fuel tank 22 and through the regular fuel fill hose 46 and may be positioned in the siphon position to pump fuel through the regular fuel siphon hose 48 and into the regular fuel tank. In a similar manner the first and second mixed fuel valves each have fill and siphon positions as indicated on the upper portion of the wall 28. The first and second mixed fuel valves may be moved between the fill and siphon positions by the handles 58 and although not shown the first and second regular fuel valves 38 and 40 have similar handles disposed on the outside of the upper portion of the wall 26. The mixed fuel valves may therefore be positioned in the fill position to pump fuel from the mixed fuel tank 24 through the mixed fuel fill hose 54 and may be positioned in the siphon position to pump fuel through the mixed fuel siphon hose 56 and into the mixed fuel tank 24.

Each of the fill hoses 46 and 54 has a manually operated nozzle 60 on the free end thereof. Plates or tubular members 62 are attached to the tanks 22 and 24 and the nozzles include hooks 64 for being supported by the plates 62.

Each siphon hose 48 and 56 has a quick disconnect coupling 66 on the free end thereof and there is a mating quick disconnect coupling on each of the fuel tanks 20 and 24 for connecting the respective siphon hoses 48 and 56 associated therewith to establish fluid communication between each siphon hose and its associated tank. This is a very important feature in that when the siphon hoses 48 and 56 are withdrawn from a tank from which fuel has been siphoned, they may be connected to the quick disconnect coupling on the respective tank whereby fuel in the hoses will drain from the hoses and from the valves and the associated pump back into the associated tank. It will be appreciated that this is an important safety feature.

There is also included vent hose 68 in communication with the fuel tanks 22 and 24 by way of the line 70. The vent hose 68 has a quick disconnect coupling 72 at the free end thereof. The quick disconnect coupling 72 is of the type which automatically opens the vent line 68 when not connected to a mating quick disconnect coupling. Normally the assembly is utilized inside of a building and pipes or conduits will extend from within the building to the exterior thereof. When the assembly is in use the quick disconnect coupling 72 is attached to such a permanently fixed vent line and the fuel tanks 22 and 24 will be vented. However, it is important that quick disconnect coupling 72 be automatically open when not connected to a mating coupling to prevent the build-up of pressure within the tank. Bracket 73 is secured to the side of the tank 34 and engages the quick disconnect coupling 72 for supporting the vent hose 68 in a stored position.

The assembly also includes oil tank means comprising the used oil tank 74 and the new oil tank 76. A manually operated oil pump 78 is disposed atop the new oil tank 76 and an oil fill hose 80 is connected to the oil pump 78. The free end of the oil fill hose 80 has a quick disconnect coupling attached thereto and the new oil tank 76 has a mating quick disconnect coupling whereby the oil fill hose may be sorted in the position illustrated so that upon inadvertent pumping of the pump 78 oil will merely by pumped back into the new oil tank 76. The used oil tank 74 has a dished top 84 with an opening 86 thereinto at the lowest point in the top for draining used oil into the used oil tank 74.

The oil tanks 74 and 76 are spaced from the fuel tanks 22 and 24 and a platform 88 is disposed in the space between the oil tanks and the fuel tanks. The platform 88 is suitable for supporting a small engine whereby the fuel and oil may be inserted into and removed from the engine.

The fuel tanks have fill openings normally closed by the caps 90 and the new oil tank 76 has an opening for filling which is normally closed by the cap 92. Also the used oil tank 74 has a valve drain in the bottom thereof for draining used oil therefrom. All of the hoses have a metal brading or other means running therethrough to provide a ground.

The embodiments of the invention in which an exclusive property or privilege is claimed are defined as follows:

1. A flammable fluid handling assembly comprising: a regular fuel tank, a regular fuel pump, a first regular fuel valve, a second regular fuel valve, a fluid line connecting said regular fuel pump with said first regular fuel valve and another fluid line connecting said regular fuel pump with said second regular fuel valve, a regular fuel fill hose connected to said first regular fuel valve, a regular fuel siphon hose connected to said second regular fuel valve, regular fuel fluid line means connecting said first and second regular fuel valves with said regular fuel tank, said first and second regular fuel valves each having fill and siphon positions whereby said valves may be positioned in said fill position to pump fuel from said tank and through said regular fuel fill hose and may be positioned in said siphon position to pump fuel through said regular fuel siphon hose and into said regular fuel tank, a mixed fuel tank, a mixed fuel pump, a first mixed fuel valve, a second mixed fuel valve, a fluid line connecting said mixed fuel pump with said first mixed fuel valve and another fluid line connecting said mixed fuel pump with said second mixed fuel valve, a mixed fuel fill hose connected to said first mixed fuel valve, a mixed fuel siphon hose connected to said second mixed fuel valve, mixed fuel fluid line means connecting said first and second mixed fuel valves with said mixed fuel tank, said first and second mixed fuel valves each having fill and siphon positions whereby said mixed fuel valves may be positioned in said fill position to pump fuel from said mixed fuel tank and through said mixed fuel fill hose and may be positioned in said siphon position to pump fuel through said mixed fuel siphon hose and into said mixed fuel tank, a used oil tank, a new oil tank, an oil pump in fluid communication with said new oil tank, an oil fill hose connected to said oil pump, said oil tanks being spaced from said fuel tanks, a platform disposed between said oil tanks and said fuel tanks, and support means for supporting said platform, tanks, valves and pumps.

2. An assembly as set forth in claim 1 wherein said pumps are manually operated pumps.

3. An assembly as set forth in claim 1 wherein each of said fill hoses has a manually operated nozzle on the free end thereof.

4. An assembly as set forth in claim 1 wherein each siphon hose has a quick disconnect coupling on the free end thereof, a mating quick disconnect coupling on each fuel tank for connecting to the siphon hose associated therewith to establish fluid communication between each siphon hose and its associated tank.

5. An assembly as set forth in claim 1 wherein the free end of said oil fill hose has a quick disconnect coupling thereon and said new oil tank has a mating quick disconnect coupling for establishing fluid communication between said oil fill hose and said new oil tank when said oil fill hose is not in use.

6. An assembly as set forth in claim 1 including wheels on said support means whereby said assembly is mobile.

7. An assembly as set forth in claim 1 wherein said used oil tank has a dished top with an opening thereinto at the lowest point thereof for draining used oil into said used oil tank.

8. An assembly as set forth in claim 1 including a vent hose in communication with said fuel tanks.

9. An assembly as set forth in claim 8 wherein said vent hose has a quick disconnect coupling at the free end thereof.

* * * * *